July 9, 1929.  R. SARAZIN  1,720,446
ELECTRIC ARC WELDING TRANSFORMER AND CONTROLLING DEVICE
Filed June 8, 1927   2 Sheets-Sheet 1

Inventor
Robert Sarazin
By C. M. Clarke
Attorney

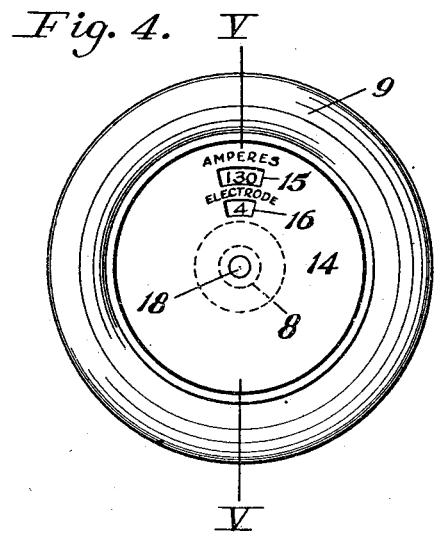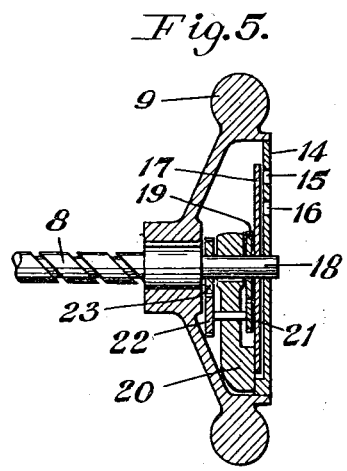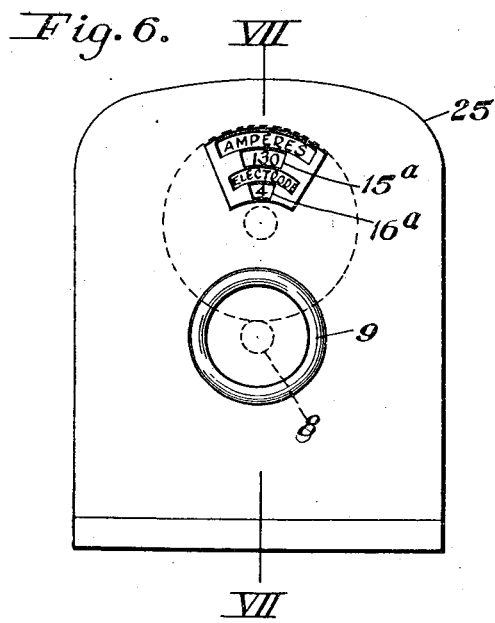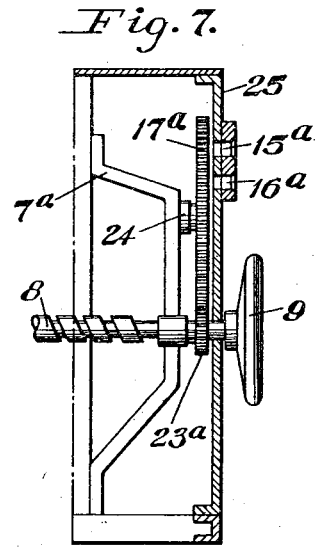

Patented July 9, 1929.

1,720,446

UNITED STATES PATENT OFFICE.

ROBERT SARAZIN, OF NEUILLY-SUR-SEINE, FRANCE.

ELECTRIC-ARC WELDING TRANSFORMER AND CONTROLLING DEVICE.

Application filed June 8, 1927, Serial No. 197,382, and in France June 12, 1926.

My invention relates to an improved electric arc welding transformer and controlling device.

It ha., in view to provide means for varying the current applicable to arc welding through and by a transformer, by adjustment of the coils thereof in connection with an adjustable magnetic core.

In the practice of arc welding, a transformer for control of the currents should be capable of delivering from a no load voltage to a sufficiently high voltage to permit of a good striking of the arc, and also to produce a welding voltage of from twenty to twenty-five volts sufficient to sustain an arc of normal length.

It is already known that it is possible to make an arc welding transformer with secondary coils displaceable or adjustable as to the primary coils, or vice versa. Such disposition or arrangement generally gives good results, but the space between the coils is necessarily very wide if the operator requires small values of welding current, thus involving a long magnetic core, with accompanying complications of construction.

It has also been proposed to introduce a magnetic shunt in the magnetic field of a common transformer, with a secondary wound over the primary, or reversely. Such solution is not successful as it is difficult for the operator to adjust the apparatus for small or low voltage currents.

In my present invention I provide means, operating on similar principles, but simplified and capable of exact adjustment with relatively wide ranges of variation, together with means for exact indication of current values.

I also introduce between the primary and secondary coils, a magnetic core, capable of effecting a wide variation of the current by its presence between the spaced apart coils. The core acts also to effect bodily movement of one of the coils by mechanical movement thereof, as hereinafter described.

In the drawings, showing certain preferred embodiments of the invention:

Fig. 4 is a face view of the operating hand wheel for such adjusting screw, provided with indicating mechanism;

Fig. 5 is a vertical sectional view thereof on the line V—V of Fig. 4;

Fig. 6 is a view similar to Fig. 4, of a modified construction;

Fig. 7 is a vertical section thereof on the line VII—VII of Fig. 6.

Figure 1:
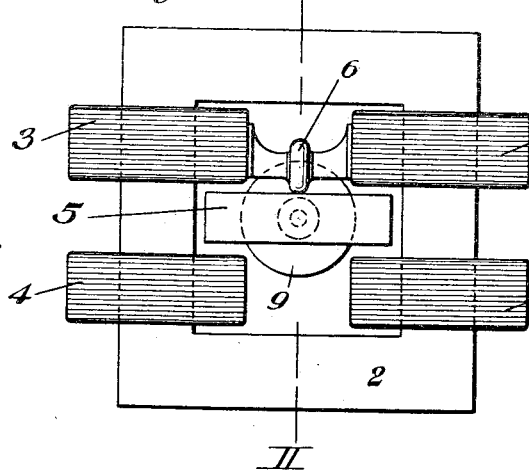
Fig. 1 is a view in front elevation of the core and windings of a welding transformer with the adjusting mechanism for one of the windings.
Figure 2:
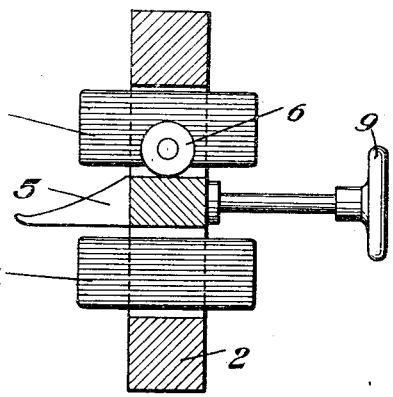
Fig. 2 is a vertical section on the line II—II of Fig. 1.
Figure 3:
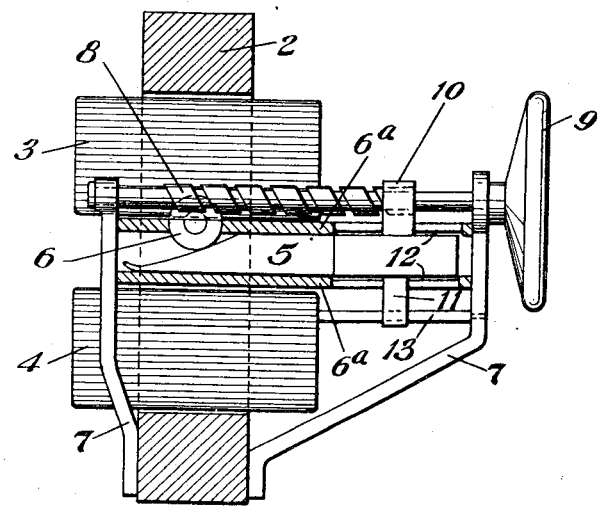
Fig. 3 is a similar sectional view showing a modified construction, providing a screw adjustment for the magnetic shift mechanism.

Referring to Figs. 1, 2 and 3 of the drawings, 2 is the magnetic core of a welding transformer, of a double-sided form upon which are imposed the two sets of windings, to wit, the primary windings 3 and the secondary windings 4. As is generally understood, the primary and secondary windings variably effect the current, dependent on their distance apart.

One of the set of windings, as primary coil 3, is moved separably away from the secondary winding 4, contemporaneous with the introduction of the magnetic core or shunt 5. The core 5 is moved inwardly or outwardly between the primary and secondary by any suitable means, not shown in Figs. 1 and 2. Its inner end is tapered or wedge shaped, and engages a roller 6 pivotally carried between the primary coils 3, and supporting them. As the core 5 is moved inwardly or withdrawn, it may effect a separation or approach of the primary and secondary through an interval of approximately two inches between the two. As the upper or primary windings are elevated, with introduction of the magnetic shunt 5 the minimum values of current are established. Reversely, by lowering the primary windings toward or into contact with the secondary 4, accompanying withdrawal of the magnetic shunt, the maximum values of current are established. I may therefore effect a variation in value of current varying from 180 amperes down to 40 or 50 amperes, and intervening ranges. These values cover the entire available field of practical application to metallic arc welding. By gradually advancing the separating core 5 the current diminishes, as the roller 6 is elevated to the maximum, and rests on the flat upper surface of the core. During such separation of the coils, and insertion of the magnetic core 5, the magnetic lines of force of the transformer are shunted through and do not pass across the secondary coils. By such operation the user is enabled to secure a definite and progressive variation of current during movement of the magnetic core, until the moment of axial co-incidence. In such position the value of the welding current will be at its minimum.

It will also be obvious that by setting the coils at definitely spaced locations, i. e. with a predetermined interval, corresponding to a definite desired value of current, the utility of the invention will be greatly increased.

For such purpose I provide the mechanism shown in Fig. 3, utilizing a worm or screw gear adjustment for the magnetic shunt or core 5. In such case the core is slidably mounted between insulating guide rods or slides 6ª extending across between supporting frames 7 secured to the lower middle part of core 2.

Shunt core 5 is moved inwardly or outwardly by means of a screw shaft 8 rotatably mounted in the upper portion of frame members 7 and having a hand wheel 9. Screw 8 engages the nut terminal 10 of stem 11 which extends through core 5 and clearance slots 12 of insulating guides 6ª, and is slidably mounted by its terminal on the cross rod 13 of the frame.

For the purpose of indicating to the operator at all times the value of the current, dependent on such adjustment, means for such indication are provided, as in Figs. 4 to 7 inclusive.

Referring to Figs. 4 and 5 the hand wheel 9 is provided with a hollow interior covered by a front plate 14. Such plate fits upon or within the annular edge of the hand wheel, and is provided with indicating openings 15 and 16. One of these (15) is for indicating the ampere reading, the other (16) for the corresponding size of electrode.

For giving such indication, a disk 17 is rotatably journalled on an extended stem 18 of the screw 8 together with a pinion gear 19. A weighted counterpoise 20 is provided with freely journalled idler pinions 21, 22, by which movement is transmitted from a pinion 23 secured to the screw shaft extension 18. As the hand wheel is turned to right or left, moving the magnetic core 5 inwardly or outwardly, the corresponding value indications on dial 17 are brought into register with the openings 15 and 16, for observation.

In the construction shown in Figs. 6 and 7 the movement of the hand wheel 9 and screw shaft 8 is transmitted through a pinion 23ª and an indication gear 17ª pivotally mounted at 24 on frame 7ª.

The front face of gear 17ª is provided with an area showing cumulative value indications which come successively into register with openings 15ª, 16ª, of a casing 25 of any suitable construction. With either arrangement the working condition of the transformer may be noted at any time, so that the operator can at the same time read the value of intensity of current in the area and also the corresponding diameter dimensions of the electrodes.

The construction and operation of the transformer and its adaption to the objects in view will be readily understood and appreciated from the foregoing description. The improvement may be placed on any suitable part of a standard apparatus, and may be changed or varied by the skilled mechanic to adapt it to local conditions of use, within the scope of the following claims.

What I claim is:

1. In a transformer for welding machines or the like having primary and secondary windings, wedging means for moving one of said windings away from the other into varying parallel positions.

2. In a transformer for welding machines or the like having primary and secondary windings, a bearing element on one of said windings, and a screw actuated wedge engaging said bearing element for introducing a magnetic shunt between said windings with simultaneous separation thereof.

3. In a transformer for welding machines or the like having primary and secondary windings, screw actuated wedging means for moving the primary winding away from the secondary winding in constant direction while maintaining parallelism of the windings.

4. In a transformer for welding machines or the like having primary and secondary windings, screw actuating wedging means for moving the primary winding away from the secondary winding in constant direction while maintaining parallelism of the windings, to effect a variation in current value, and means geared with the screw actuating means for indicating such variation.

5. In a variable voltage transformer, a magnetic core, primary and secondary coils spaced apart on said core, and a transversely movable magnetic core insertible between the primary and secondary coils having wedging means for moving one of said coils away from the other.

6. In a variable voltage transformer, a magnetic core, primary and secondary coils spaced apart on said core, and a transversely movable magnetic core insertible between the primary and secondary coils having wedging means for moving the primary coil away from the secondary coil in a constant direction while maintaining parallelism of the coils.

7. In a variable voltage transformer, a magnetic core, primary and secondary coils spaced apart on said core, one of said coils having a roller, and a transversely movable magnetic core insertible between the primary and secondary coils having a wedge engaging the roller for moving the roller-provided core away from the other.

8. In a variable voltage transformer, a magnetic core, primary and secondary coils spaced apart on said core, one of said coils having a roller, a transversely movable magnetic core insertible between the primary and secondary coils having a wedge engaging the roller for moving the roller-provided core away from the other, and adjusting screw mechanism for actuating the movable core.

9. In a transformer for welding machines or the like, a magnetic core, a stationary winding thereon, a movable winding thereon in parallelism therewith having a wedge bearing element, a transversely movable magnetic shunt having a wedge between the windings engaging said bearing element, and means for actuating the shunt.

10. In a transformer for welding machines or the like, a magnetic core, a stationary winding thereon, a movable winding thereon in parallelism therewith having a wedge bearing element, a transversely movable magnetic shunt having a wedge between the windings engaging said bearing element, guiding and supporting means therefor, and screw adjusting mechanism for moving the shunt inwardly and outwardly between the windings.

In testimony whereof I hereunto affix my signature.

ROBERT SARAZIN.